United States Patent
Takemoto et al.

(10) Patent No.: US 11,845,818 B2
(45) Date of Patent: Dec. 19, 2023

(54) ACTIVE ENERGY RAY CROSSLINKABLE THERMOPLASTIC POLYMER AND COMPOSITION CONTAINING THE SAME

(71) Applicant: KURARAY CO., LTD., Okayama (JP)

(72) Inventors: Kenta Takemoto, Ibaraki (JP); Keiji Kubo, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 136 days.

(21) Appl. No.: 17/438,599

(22) PCT Filed: Mar. 12, 2020

(86) PCT No.: PCT/JP2020/010763
§ 371 (c)(1),
(2) Date: Sep. 13, 2021

(87) PCT Pub. No.: WO2020/189486
PCT Pub. Date: Sep. 24, 2020

(65) Prior Publication Data
US 2022/0251249 A1 Aug. 11, 2022

(30) Foreign Application Priority Data
Mar. 19, 2019 (JP) .................................. 2019-051006

(51) Int. Cl.
| | |
|---|---|
| C08F 2/46 | (2006.01) |
| C08F 2/48 | (2006.01) |
| B29C 48/00 | (2019.01) |
| C08F 222/10 | (2006.01) |
| B29C 45/00 | (2006.01) |
| B32B 27/08 | (2006.01) |
| B32B 27/30 | (2006.01) |
| C08F 2/54 | (2006.01) |
| C08F 220/14 | (2006.01) |

(52) U.S. Cl.
CPC ............ *C08F 2/48* (2013.01); *B29C 45/0001* (2013.01); *B29C 48/022* (2019.02); *B32B 27/08* (2013.01); *B32B 27/308* (2013.01); *C08F 2/54* (2013.01); *C08F 220/14* (2013.01); *C08F 222/102* (2020.02); *B32B 2250/02* (2013.01); *B32B 2250/24* (2013.01)

(58) Field of Classification Search
CPC .. C08F 299/00; C08F 236/04; C08F 222/102; C08F 222/18; C08F 222/14; C08F 120/40; C08F 2/48; C08F 2/26; C08F 2/54; C08F 2/50; C08F 220/14; C08F 220/40; B32B 2250/24; B32B 2250/05; B32B 27/302; B32B 27/308; B32B 27/22; B32B 27/20; B32B 27/18; B32B 27/08; B29C 48/022; B29C 45/0001
See application file for complete search history.

(56) References Cited

U.S. PATENT DOCUMENTS

| | | | |
|---|---|---|---|
| 5,264,527 A | 11/1993 | Varshney et al. | |
| 9,051,398 B2 | 6/2015 | Tanabe et al. | |
| 9,475,967 B2 * | 10/2016 | Lipscomb | ................ C09J 7/385 |
| 2015/0037526 A1 | 2/2015 | Seth et al. | |
| 2015/0038658 A1 * | 2/2015 | Tanabe | .................. C08F 220/14 |
| | | | 526/177 |
| 2016/0017187 A1 | 1/2016 | Lipscomb et al. | |
| 2020/0339724 A1 | 10/2020 | Takai et al. | |
| 2021/0246244 A1 | 8/2021 | Noguchi et al. | |

FOREIGN PATENT DOCUMENTS

| | | |
|---|---|---|
| CN | 105121579 A | 12/2015 |
| EP | 0 060 042 A2 | 9/1982 |
| EP | 3 712 185 A1 | 9/2020 |
| JP | H05-507737 | 11/1993 |
| JP | H06-93060 | 4/1994 |
| JP | H09-48821 | 2/1997 |
| JP | H09-235321 | 9/1997 |
| JP | H11-335432 | 12/1999 |
| JP | 2016-521306 | 7/2016 |
| JP | 2018-002972 | 1/2018 |
| JP | 2018-020442 | 2/2018 |
| JP | 2018-020569 | 2/2018 |
| JP | 2018-021201 | 2/2018 |
| JP | 2018-028049 | 2/2018 |
| JP | 2018-062572 | 4/2018 |

(Continued)

OTHER PUBLICATIONS

Extended European Search Report issued in EP Patent Application No. 207734310, dated Nov. 22, 2022.

(Continued)

*Primary Examiner* — Sanza L. McClendon
(74) *Attorney, Agent, or Firm* — GREENBLUM & BERNSTEIN P.L.C.

(57) ABSTRACT

The present invention provides a polymer which has a polymerizable functional group but still can be thermoformed without being crosslinked and which undergoes crosslinking upon irradiation with an active energy ray after being formed, and a composition including the polymer. An active energy ray crosslinkable thermoplastic polymer includes specific monomer units (1). The ratio of the number of moles of the monomer units represented by the general formula (1) to the number of moles of all monomer units constituting the polymer is not less than 1 mol %. The number average molecular weight (Mn) of the active energy ray crosslinkable thermoplastic polymer is 20,000 to 500,000.

16 Claims, No Drawings

(56) References Cited

FOREIGN PATENT DOCUMENTS

| WO | 2013/141105 | 9/2013 |
| WO | 2019/098153 | 5/2019 |
| WO | 2019/208353 | 10/2019 |

OTHER PUBLICATIONS

"Hydrogen Abstraction Ability and Initiator Efficiency of Organic Peroxide," Nippon Oil & Fat Co., Ltd., (Apr. 2003), along with a machine English language translation.
International Search Report issued in PCT/JP2020/010763, dated Jun. 2, 2020, along with an English translation.
Written Opinion of the International Searching Authority issued in PCT/JP2020/010763, dated Jun. 2, 2020, along with an English translation.
"Hydrogen Abstraction Ability and Initiator Efficiency of Organic Peroxide," Nippon Oil & Fat Co., Ltd., (Apr. 2003), along with an English translation.
Polymer Handbook, Fourth Edit., Bandrup et al. (Editors), II p. 310, 1999.

* cited by examiner

ACTIVE ENERGY RAY CROSSLINKABLE THERMOPLASTIC POLYMER AND COMPOSITION CONTAINING THE SAME

TECHNICAL FIELD

The present invention relates to a thermoplastic polymer having a specific active energy ray crosslinkable structure, and to a composition containing the polymer.

BACKGROUND ART

Crosslinking is one of the effective approaches for improving properties such as mechanical properties, heat resistance and solvent resistance of various polymer materials.

For example, crosslinked products of polymer materials may be obtained by curing a crosslinkable composition which includes a compound having a polymerizable functional group, or by curing a crosslinkable composition which includes an isocyanate and a hydroxyl-containing compound through the formation of urethane bonds.

Crosslinking is also an effective approach for modifying the surface of polymer materials. In an exemplary surface modification method, a crosslinkable composition described above that is in the form of a liquid including an organic solvent (hereinafter, also written simply as solvent-based composition) is applied to a polymer material as a substrate at a low temperature, the coating being then dried, and the film is crosslinked by heating (see, for example, Patent Literatures 1 to 4). In the recent surface modification of polymer materials, there is a trend away from crosslinkable compositions containing organic solvents and toward a shift to surface modification with water-based crosslinkable compositions (hereinafter, also written simply as aqueous compositions) (see, for example, Patent Literatures 5 and 6).

CITATION LIST

Patent Literature

Patent Literature 1: JP-A-2018-002972
Patent Literature 2: JP-A-2018-020442
Patent Literature 3: JP-A-2018-020569
Patent Literature 4: JP-A-2018-028049
Patent Literature 5: JP-A-2018-021201
Patent Literature 6: JP-A-2018-062572

SUMMARY OF INVENTION

Technical Problem

When a polymer material in a crosslinkable composition is crosslinked to a high degree, it is difficult for the crosslinked product to be thermoformed afterwards by injection molding, extrusion or the like. Crosslinkable compositions are sometimes crosslinked to some degree and are used as crosslinkable polymer materials which have some residual crosslinkable groups for use in later reaction. Unfortunately, conventional crosslinkable polymer materials are often difficult to thermoform due to the occurrence of crosslinking by heat during the thermoforming process.

When a polymer material is surface-modified with a solvent-based composition, the polymer material to be modified on the surface is often attacked by the organic solvent contained in the solvent-based composition. On the other hand, an aqueous composition is unlikely to cause the above problem, but tends to be inferior in performance to a solvent-based composition and requires more energy for drying than a solvent-based composition. These facts hinder the shift to aqueous compositions. A possible surface modification method free from organic solvents is a multilayer process such as multilayer extrusion of a thermoplastic polymer material as a substrate and a crosslinkable polymer material as a surface portion. However, such a multilayer process encounters difficulty when a conventional crosslinkable polymer material is used, due to the aforementioned problem occurring during thermal melting.

The present invention has been made based on the circumstances discussed above. Objects of the present invention are therefore to provide a polymer which has a polymerizable functional group but still can be thermoformed without being crosslinked and which undergoes crosslinking upon irradiation with an active energy ray after being formed, and to provide a composition including the polymer.

Solution to Problem

After extensive studies directed to solving the above problems, the present inventors have found that a polymer of a specific molecular weight which includes a specific structure in a specific proportion can be thermoformed without being crosslinked and undergoes crosslinking upon irradiation with an active energy ray after being formed. The present invention has been completed based on the finding.

Specifically, the present invention pertains to:

[1] An active energy ray crosslinkable thermoplastic polymer including monomer units represented by the following general formula (1),
 the ratio of the number of moles of the monomer units represented by the general formula (1) to the number of moles of all monomer units constituting the polymer being not less than 1 mol %,
 the active energy ray crosslinkable thermoplastic polymer having a number average molecular weight (Mn) of 20,000 to 500,000,

[Chem. 1]

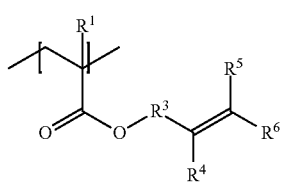

(1)

wherein $R^1$ is hydrogen or a methyl group, $R^3$ is a C1-C10 saturated hydrocarbon group, $R^4$ is hydrogen or a C1-C5 saturated hydrocarbon group, $R^5$ and $R^6$ are each hydrogen or a C1-C20 saturated hydrocarbon group, and at least one of $R^4$, $R^5$ and $R^6$ is a saturated hydrocarbon group.

[2] The active energy ray crosslinkable thermoplastic polymer described in [1], wherein the ratio of the number of moles of the monomer units represented by the general formula (1) to the number of moles of all the monomer units constituting the polymer is not more than 40 mol %.

[3] The active energy ray crosslinkable thermoplastic polymer described in [1] or [2], wherein $R^5$ and $R^6$ are each hydrogen.

[4] The active energy ray crosslinkable thermoplastic polymer described in [1] or [2], wherein $R^4$ is hydrogen.

[5] The active energy ray crosslinkable thermoplastic polymer described in any of [1] to [4], wherein the monomer units represented by the general formula (1) are monomer units derived from an ester of an unsaturated alcohol having a Q value of not less than 0.001 and not more than 0.35.

[6] A composition including:
the active energy ray crosslinkable thermoplastic polymer described in any of [1] to [5], and
a thermoplastic polymer including monomer units derived from at least one monomer selected from the group consisting of methyl (meth)acrylate, styrene, acrylonitrile, butadiene and isoprene.

[7] A shaped product obtained from the active energy ray crosslinkable thermoplastic polymer described in any of [1] to [5] or the composition described in [6].

[8] A shaped product obtained by injection molding the active energy ray crosslinkable thermoplastic polymer described in any of [1] to [5] or the composition described in [6].

[9] A shaped product obtained by extruding the active energy ray crosslinkable thermoplastic polymer described in any of [1] to [5] or the composition described in [6].

[10] A multilayer shaped product including:
a layer obtained from the active energy ray crosslinkable thermoplastic polymer described in any of [1] to [5] or the composition described in [6], and
a layer obtained from a thermoplastic polymer including monomer units derived from at least one monomer selected from the group consisting of methyl (meth) acrylate, styrene, acrylonitrile, butadiene and isoprene.

[11] A cured product of the shaped product described in any of [7] to [10].

[12] An article obtained by secondary processing of the cured product described in [11].

Advantageous Effects of Invention

The present invention provides a (meth)acrylic block copolymer having excellent active energy ray crosslinkability, an active energy ray crosslinkable composition containing the (meth)acrylic block copolymer, and cured products of these materials.

The polymer of the present invention has a polymerizable functional group but still can be thermoformed without being crosslinked, and undergoes crosslinking upon irradiation with an active energy ray after being formed. The composition provided according to the present invention includes the polymer. After being crosslinked, the polymer exhibits excellent properties such as, for example, heat resistance and solvent resistance.

DESCRIPTION OF EMBODIMENTS

The present invention will be described in detail hereinbelow.

In the present specification, the term "(meth)acrylic" is a general term indicating both "methacrylic" and "acrylic". 〈Active Energy Ray Crosslinkable Thermoplastic Polymers〉

An active energy ray crosslinkable thermoplastic polymer of the present invention includes monomer units represented by the following general formula (1). The ratio of the number of moles of the monomer units represented by the general formula (1) to the number of moles of all monomer units constituting the polymer is not less than 1 mol %. The number average molecular weight (Mn) of the active energy ray crosslinkable thermoplastic polymer is 20,000 to 500,000. Hereinbelow, the monomer units represented by the general formula (1) will be also written as the monomer units (1). The monomer unit (1) means the chemical structure in the parenthesis in the formula (1) below.

[Chem. 2]

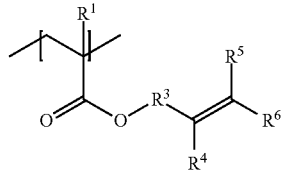

(1)

In the formula (1), $R^1$ is hydrogen or a methyl group, $R^3$ is a C1-C10 saturated hydrocarbon group, $R^4$ is hydrogen or a C1-C5 saturated hydrocarbon group, $R^5$ and $R^6$ are each hydrogen or a C1-C20 saturated hydrocarbon group, and at least one of $R^4$, $R^5$ and $R^6$ is a saturated hydrocarbon group.

The monomer units (1) exhibit polymerizability when irradiated with an active energy ray. Thus, the crosslinkable thermoplastic polymer of the present invention, or a composition including the polymer, is crosslinked into a cured product by the application of an active energy ray. In the present specification, the active energy ray means any of light rays, electromagnetic waves, particle rays and combinations thereof. Examples of the light rays include far-ultraviolet lights, ultraviolet lights (UV), near-ultraviolet lights, visible lights and infrared lights. Examples of the electromagnetic waves include X-rays and γ-rays. Examples of the particle rays include electron beams (EB), proton beams (a beams) and neutron beams.

In the general formula (1), $R^1$ denotes hydrogen or a methyl group.

In the general formula (1), $R^3$ denotes a C1-C10 saturated hydrocarbon group. Here, the saturated hydrocarbon group that may be represented by $R^3$ is a divalent hydrocarbon group having no double bonds or triple bonds. $R^3$ may be linear, branched or cyclic, preferably linear or branched, and more preferably linear. Examples of the C1-C10 saturated hydrocarbon groups represented by $R^3$ include methane-1, 1-diyl group, ethane-1,1-diyl group, ethane-1,2-diyl group, propane-1,1-diyl group, propane-1,2-diyl group, propane-1, 3-diyl group, pentane-1,5-diyl group, hexane-1,6-diyl group, octane-1,8-diyl group and cyclohexane-1,4-diyl group. From the point of view of active energy ray crosslinkability, $R^3$ is preferably a C1-C6 saturated hydrocarbon group, and more preferably a methane-1,1-diyl group or an ethane-1,2-diyl group.

In the general formula (1), $R^4$ denotes hydrogen or a C1-C5 saturated hydrocarbon group. Here, the saturated hydrocarbon group that may be represented by $R^4$ is a monovalent hydrocarbon group having no double bonds or triple bonds. Examples of the C1-C5 saturated hydrocarbon groups represented by $R^4$ include alkyl groups such as methyl group, ethyl group, n-propyl group, isopropyl group, n-butyl group, isobutyl group, sec-butyl group, t-butyl group, 2-methylbutyl group and 3-methylbutyl group; and cycloalkyl groups such as cyclopropyl group, cyclobutyl group and cyclopentyl group. From the point of view of active energy ray crosslinkability, $R^4$ is preferably a C1-C3 saturated hydrocarbon group (such as, for example, a C1-C3 alkyl group such as a methyl group, an ethyl group, an n-propyl group or an isopropyl group; or a C3 cyclopropyl group), and more preferably hydrogen or a methyl group.

In the general formula (1), $R^5$ and $R^6$ each denote hydrogen or a C1-C20 saturated hydrocarbon group. Here, the saturated hydrocarbon groups that may be represented by $R^5$ and $R^6$ are monovalent hydrocarbon groups having no double bonds or triple bonds. Examples of the C1-C20 saturated hydrocarbon groups represented by $R^5$ and $R^6$ include alkyl groups such as methyl group, ethyl group, n-propyl group, isopropyl group, n-butyl group, isobutyl group, sec-butyl group, t-butyl group, 2-methylbutyl group, 3-methylbutyl group, 2-ethylbutyl group, 2,2-dimethylbutyl group, 2,3-dimethylbutyl group, n-pentyl group, neopentyl group, n-hexyl group, 2-methylpentyl group, 3-methylpentyl group and n-decyl group; and cycloalkyl groups such as cyclopropyl group, cyclobutyl group, cyclopentyl group and cyclohexyl group. From the point of view of active energy ray crosslinkability, $R^5$ and $R^6$ are preferably each hydrogen or a C1-C5 saturated hydrocarbon group (such as, for example, a C1-C5 alkyl group such as a methyl group, an ethyl group, an n-propyl group, an isopropyl group, an n-butyl group, an isobutyl group, a sec-butyl group, a t-butyl group, a 2-methylbutyl group, a 3-methylbutyl group, an n-pentyl group or a neopentyl group; or a C3-C5 cycloalkyl group such as a cyclopropyl group, a cyclobutyl group or a cyclopentyl group), and more preferably each hydrogen or a methyl group.

In the general formula (1), at least one of $R^4$, $R^5$ and $R^6$ is a saturated hydrocarbon group. The polymer exhibits low thermal crosslinking tendency and attains excellent thermoformability by virtue of at least one of $R^4$, $R^5$ and $R^6$ being a saturated hydrocarbon group.

In particular, from the point of view of active energy ray crosslinkability, it is preferable that $R^4$ be a saturated hydrocarbon group, and $R^5$ and $R^6$ be hydrogen, and it is more preferable that $R^4$ be a methyl group, and $R^5$ and $R^6$ be hydrogen.

From the point of view of active energy ray crosslinkability, it is also preferable that $R^4$ be hydrogen, and at least one of $R^5$ and $R^6$ be a saturated hydrocarbon group, and it is more preferable that $R^4$ be hydrogen, and $R^5$ and $R^6$ be methyl groups.

At least one of the pair of $R^3$ and $R^5$ and the pair of $R^4$ and $R^6$ may be bonded to each other to form a ring. However, in the present invention, it is preferable that no such rings be present.

The ratio of the number of moles of the monomer units (1) to the number of moles of all the monomer units constituting the active energy ray crosslinkable thermoplastic polymer is not less than 1 mol %. This proportion of the monomer units (1) ensures that the polymer will exhibit active energy ray crosslinkability. From the point of view of active energy ray crosslinkability, the ratio of the number of moles of the monomer units (1) to the number of moles of all the monomer units constituting the active energy ray crosslinkable thermoplastic polymer is preferably not less than 1.5 mol %, and more preferably not less than 3 mol %. To suppress the occurrence of crosslinking at the time of thermoforming, the ratio of the number of moles of the monomer units (1) to the number of moles of all the monomer units constituting the active energy ray crosslinkable thermoplastic polymer is preferably not more than 40 mol %, more preferably not more than 30 mol %, still more preferably not more than 20 mol %, and further preferably not more than 10 mol %.

The active energy ray crosslinkable groups including the monomer unit (1) may be present at the terminals or side chains of the active energy ray crosslinkable thermoplastic polymer. To ensure that the monomer units (1) will be introduced in the preferred proportion, it is preferable that such groups be present at least in side chains.

For example, the monomer units (1) may be introduced into the polymer by incorporating a monomer represented by the following general formula (2) into the polymer main chain through the polymerization reaction of the (meth) acryloyl group in the monomer.

[Chem. 3]

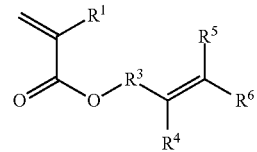

(2)

The definitions, specific examples and preferred examples of $R^1$ and $R^3$ to $R^6$ in the formula (2) are the same as in the formula (1).

From the point of view of easy purification and storage stability of the monomer, the active energy ray crosslinkable thermoplastic polymer preferably includes monomer units derived from a methacrylic acid ester represented by the following general formula (2'). The methacrylic acid ester of the general formula (2') is polymerized through the methacryloyl group contained therein to introduce the monomer units (1) in the active energy ray crosslinkable thermoplastic polymer that is obtained.

[Chem. 4]

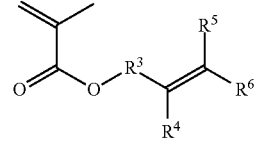

(2')

In the formula (2'), the definitions, specific examples and preferred examples of $R^3$ to $R^6$ are the same as in the formula (1).

The monomer units (1) present in the active energy ray crosslinkable thermoplastic polymer are preferably structures that are derived from an ester of an unsaturated alcohol having a Q value of a carbon-carbon double bond moiety contained in its structure of not less than 0.001 and not more than 0.35. In the present invention, the Q value means the Q value in the Q-e scheme proposed by Alfrey and Price. This Q value is a parameter indicating the resonance stability of a radical. The larger the value, the more stable the radical. Hereinafter, the Q value and the e value in the Q-e scheme will be described based on a general model in which radically polymerizable monomers $M_1$ and $M_2$ are copolymerized. Incidentally, the e value is a parameter indicating the polarity of a radical. A positive e value means that the monomer is electron accepting, and a negative e value means that the monomer is electron donating. In the Q-e scheme, characteristics of monomers are expressed using these two factors, the Q value and the e value.

The Q-e scheme will be described based on a model in which binary radical copolymerization is performed using a radically polymerizable first monomer $M_1$ and a radically polymerizable second monomer $M_2$. Here, the propagation of the elementary reactions of the binary copolymerization may be expressed by the formulas (i) below in which $M_1\bullet$ is a propagating radical terminated with an $M_1$ unit, and $M_2\bullet$ is a propagating radical terminated with an $M_2$ unit. Incidentally, $k_{11}$, $k_{12}$, $k_{21}$ and $k_{22}$ are the rate constants of the respective elementary reactions.

[Math. 1]

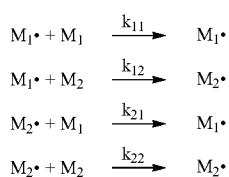

$$M_1\bullet + M_1 \xrightarrow{k_{11}} M_1\bullet$$
$$M_1\bullet + M_2 \xrightarrow{k_{12}} M_2\bullet$$
$$M_2\bullet + M_1 \xrightarrow{k_{21}} M_1\bullet$$
$$M_2\bullet + M_2 \xrightarrow{k_{22}} M_2\bullet \quad \text{(i)}$$

The resonance stability of $M_1\bullet$ is represented by parameter $Q_1$, the resonance stability of $M_1$ is represented by parameter $P_1$, the resonance stability of $M_2\bullet$ is represented by parameter $Q_2$, and the resonance stability of $M_2$ is represented by parameter $P_2$. Assuming that the e values of $M_1\bullet$ and $M_1$ are equal, and that the e values of $M_2\bullet$ and $M_2$ are equal, and when the e values of $M_1\bullet$ and $M_1$ are written as $e_1$, and the e values of $M_2\bullet$ and $M_2$ are written as $e_2$, the rate constants of the respective elementary reactions may be expressed as (ii) below.

$$k_{11} = P_1 Q_1 \exp\{-e_1 e_1\}$$
$$k_{12} = P_1 Q_2 \exp\{-e_1 e_2\}$$
$$k_{21} = P_2 Q_1 \exp\{-e_2 e_1\}$$
$$k_{22} = P_2 Q_2 \exp\{-e_2 e_2\} \quad \text{(ii)}$$

Since the reactivity ratio $r_1$ of the monomer $M_1$ and the reactivity ratio $r_2$ of the monomer $M_2$ in the radical copolymerization are $k_{11}/k_{12}$ and $k_{22}/k_{21}$, respectively, $r_1$ and $r_2$ may be expressed using the above formulas (ii) as follows (iii).

$$r_1 = k_{11}/k_{12} = Q_1/Q_2 \exp\{-e_1(e_1-e_2)\}$$
$$r_2 = k_{22}/k_{21} = Q_2/Q_2 \exp\{-e_2(e_2-e_1)\} \quad \text{(iii)}$$

Here, in the Q-e scheme, the reference monomer is styrene, and the Q value of styrene is 1.0 and the e value of styrene is −0.8. Based on these values, for example, styrene and a monomer having unknown Q and e values may be actually copolymerized to determine $r_1$ and $r_2$, and the unknown Q and e values may be calculated from these values.

For example, $r_1$ and $r_2$ described above may be determined in the following manner. The first monomer $M_1$ and the second monomer $M_2$ are copolymerized, and the polymerization reaction is stopped at a low polymerization degree (preferably a low polymerization degree of 5% or below). Calculations are then made to determine the monomer compositional ratio (the molar ratio) between the monomers $M_1$ and $M_2$ used in the polymerization, and the compositional ratio (the molar ratio) between the $M_1$ (monomer) units and the $M_2$ (monomer) units contained in the copolymer obtained. The compositional ratio between the monomer units in the copolymer may be determined by, for example, $^1$H-NMR.

The above copolymer synthesis reaction is carried out a plurality of times while changing the monomer compositional ratio between the first monomer $M_1$ and the second monomer $M_2$, and the monomer compositional ratio, and the compositional ratio between the $M_1$ (monomer) units and the $M_2$ (monomer) units in the copolymer are determined in each copolymerization reaction.

From the values obtained above, the reactivity ratios $r_1$ and $r_2$ of the monomers $M_1$ and $M_2$, respectively, are determined using the formula (iv) below. In the formula (iv), $F_1$ and $F2$ are the compositional percentages (the molar percentages) of the $M_1$ units and the $M_2$ units, respectively, in the copolymer, and $f_1$ and $f_2$ are the compositional percentage (the molar percentage) of the monomer $M_1$ and the compositional percentage (the molar percentage) of the monomer $M_2$, respectively, in the monomer mixture used.

$$F_1/F_2 = (r_1 f_1 + f_2) f_1 / \{(f_1 + r_2 f_2) f_2\} \quad \text{(iv)}$$

The monomer of the formula (2) which gives the monomer units (1) contains two types of carbon-carbon double bonds. Thus, it is difficult to determine the Q value of the carbon-carbon double bond contained in the monomer unit (1) directly from the copolymerization of the monomer represented by the formula (2) and other monomer. Therefore, the Q value of the carbon-carbon double bond contained in the monomer unit (1) is obtained by copolymerizing, with a monomer having known Q and e values, a carboxylate ester of an unsaturated alcohol ($R^5$—($R^6$)C=C($R^4$)—$R^3$—OH) corresponding to the monomer unit (1) with a monocarboxylic acid containing no carbon-carbon double bonds. The monocarboxylic acid used herein is acetic acid in light of the similarity to the structure near $R^1$ of the monomer unit (1).

In the Q-e scheme, Q values and e values are known not only of styrene but also of various general monomers. Thus, the Q value in the present invention may be determined by copolymerization with a monomer having known Q and e values other than styrene. For example, in Examples of the present invention, the Q values of monomers represented by the general formula (2) (monomers for forming monomer units represented by the general formula (1)) were determined from the formulas (i) to (iv) using data obtained by copolymerization with methyl acrylate (Q value: 0.45, e value: 0.64).

As mentioned hereinabove, the Q value is a parameter of the stability of a radical, and a larger value indicates that the radical is more stable. If the Q value is small, the radical is unstable and induces side reaction such as hydrogen abstraction which leads to a failure of the polymer to be effectively crosslinked utilizing the carbon-carbon double bond moieties contained in the monomer units (1). If, in contrast, the Q value of the carbon-carbon double bond moiety contained in the monomer unit (1) is too large, polymerizability is so increased that such carbon-carbon double bonds are consumed during the polymerization of a monomer (for example, a monomer represented by the general formula (2)) into a polymer having monomer units (1). Consequently, it becomes difficult to produce the active energy ray crosslinkable thermoplastic polymer of the present invention. From the above two viewpoints, the Q value is preferably not less than 0.001 and not more than 0.35, and more preferably not less than 0.003 and not more than 0.20.

Examples of the monomers represented by the general formula (2) include 2-methyl-2-propene (meth)acrylate, 2-butene (meth)acrylate, 3-methyl-2-butene (meth)acrylate, 3-methyl-3-butene (meth)acrylate, 2-pentene (meth)acrylate, 2-hexene (meth)acrylate, 3-hexene (meth)acrylate, 4-hexene (meth)acrylate, 2-heptene (meth)acrylate, 4-heptene (meth)acrylate, 2-octene (meth)acrylate, 3-octene (meth)acrylate, 5-octene (meth)acrylate, 2-nonene (meth)acrylate, 3-nonene (meth)acrylate, 6-nonene (meth)acrylate, 4-decene (meth)acrylate, 5-decene (meth)acrylate and 2-dodecene (meth)acrylate. Among these, 2-methyl-2-propene methacrylate, 2-butene methacrylate, 3-methyl-2-butene methacrylate, 3-methyl-3-butene methacrylate, 2-pentene methacrylate, 2-hexene methacrylate, 3-hexene methacrylate, 4-hexene methacrylate, 2-heptene methacrylate, 4-heptene methacrylate, 2-octene methacrylate, 3-octene methacrylate, 5-octene methacrylate, 2-nonene methacrylate, 3-nonene methacrylate, 6-nonene methacrylate, 4-decene methacrylate, 5-decene methacrylate and 2-dodecene methacrylate are preferable from the point of view of easy purification and storage stability of the monomers. The monomers may be used singly, or two or more may be used in combination.

The active energy ray crosslinkable thermoplastic polymer may contain monomer units derived from another monomer in addition to the monomer units represented by the general formula (1).

Examples of such additional monomers include vinyl monomers having only one polymerizable carbon-carbon double bond in the molecule such as methyl (meth)acrylate, ethyl (meth)acrylate, n-propyl (meth)acrylate, isopropyl (meth)acrylate, n-butyl (meth)acrylate, t-butyl (meth)acrylate, cyclohexyl (meth)acrylate, 2-ethylhexyl (meth)acrylate, isobornyl (meth)acrylate, dodecyl (meth)acrylate, 2-methoxyethyl (meth)acrylate, 2-hydroxyethyl (meth)acrylate, 2-hydroxybutyl (meth)acrylate, trimethoxysilylpropyl (meth)acrylate, 2-aminoethyl (meth)acrylate, N,N-dimethylaminoethyl (meth)acrylate, N,N-diethylaminoethyl (meth)acrylate, phenyl (meth)acrylate, naphthyl (meth)acrylate, 2-(trimethylsilyloxy)ethyl(meth)acrylate, 3-(trimethylsilyloxy)propyl (meth)acrylate, glycidyl (meth)acrylate, γ-((meth)acryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, acrylamide, methacrylamide, acrylonitrile, methacrylonitrile, maleic anhydride, maleimide, N-methylmaleimide, N-cyclohexylmaleimide, N-phenylmaleimide and styrene, and conjugated diene monomers such as butadiene and isoprene.

Of those described above, methacrylic acid alkyl esters having a C1-C5 alkyl group such as methyl methacrylate, ethyl methacrylate, n-propyl methacrylate, isopropyl methacrylate, n-butyl methacrylate and t-butyl methacrylate are preferable, and methyl methacrylate is more preferable. The additional monomers may be used singly, or two or more may be used in combination.

From the point of view of active energy ray crosslinkability, the content of the monomer units derived from the additional monomer is preferably not more than 99 mol %, more preferably not more than 98.5 mol %, and still more preferably not more than 97 mol % with respect to all the monomer units in the active energy ray crosslinkable thermoplastic polymer. To reduce the occurrence of crosslinking during thermoforming, the content is preferably not less than 60 mol %, and more preferably not less than 80 mol % with respect to all the monomer units in the active energy ray crosslinkable thermoplastic polymer.

The number average molecular weight (Mn) of the active energy ray crosslinkable thermoplastic polymer is 20,000 to 500,000. By virtue of the Mn being in this range, the polymer has sufficient mechanical properties for use as shaped products and can be thermoformed. From the points of view of shaping properties and mechanical properties, the Mn is preferably 25,000 to 300,000, and more preferably 30,000 to 200,000. In the present specification, the number average molecular weight and the weight average molecular weight described later are values measured by a gel permeation chromatography (GPC) method (relative to standard polystyrenes).

The active energy ray crosslinkable thermoplastic polymer of the present invention is not particularly limited as long as the polymer has the monomer units (1). For example, the polymer may be a homopolymer of a monomer which has a structure corresponding to the monomer unit (1), or may be a copolymer of a monomer which has a structure corresponding to the monomer unit (1) and another monomer. In the case of a copolymer, the polymer may be a random copolymer or a block copolymer. In the case of a block copolymer, the polymer may include the monomer units (1) in a single polymer block or may include the monomer units (1) in a plurality of polymer blocks.

The active energy ray crosslinkable thermoplastic polymer of the present invention may be prepared by any method without limitation which can produce a thermoplastic polymer containing the predetermined amount of the monomer units (1). The polymer may be preferably produced by an anionic polymerization process or a radical polymerization process.

The active energy ray crosslinkable thermoplastic polymer of the present invention may be produced by a radical polymerization process while controlling conditions such as polymerization temperature, the amount of polymerization time, the type and amount of a chain transfer agent, and the type and amount of a polymerization initiator. The radical polymerization process may be performed without a solvent or in a solvent using a polymerization technique such as suspension polymerization, bulk polymerization, solution polymerization or emulsion polymerization.

Of the techniques described above, suspension polymerization and bulk polymerization are preferable from the points of view of productivity and pyrolysis resistance. For the reason that the polymer obtained has a low impurity concentration, a solvent-free technique, that is, bulk polymerization is preferable. To reduce the occurrence of silver streaks or discoloration in shaped products produced from the polymer, it is preferable that the polymerization reaction be performed in the presence of a reduced amount of dissolved oxygen. Further, the polymerization reaction is preferably carried out in an atmosphere of an inert gas such as nitrogen gas.

The polymerization initiator used in the radical polymerization process is not particularly limited as long as it generates reactive radicals. Examples include t-hexyl peroxyisopropyl monocarbonate, t-hexyl peroxy-2-ethylhexanoate, 1,1,3,3-tetramethylbutyl peroxy-2-ethylhexanoate, t-butyl peroxypivalate, t-hexyl peroxypivalate, t-butyl peroxyneodecanoate, t-hexyl peroxyneodecanoate, 1,1,3,3-tetramethylbutyl peroxyneodecanoate, 1,1-bis(t-hexylperoxy)cyclohexane, benzoyl peroxide, 3,5,5-trimethylhexanoyl peroxide, lauroyl peroxide, di-t-butyl peroxide, 2,2'-azobis(2-methylpropionitrile), azoisobutyronitrile, 2,2'-azobis(2-methylbutyronitrile) and dimethyl 2,2'-azobis(2-methylpropionate). Among these, di-t-butyl peroxide, azoisobutyronitrile, t-hexyl peroxy-2-ethylhexanoate, 1,1,3,3-tetramethylbutyl peroxy-2-ethylhexanoate, 1,1-bis(t-hexylperoxy)cyclohexane and dimethyl 2,2'-azobis(2-methylpropionate) are preferable.

The one-hour half-life temperature of the polymerization initiator is preferably 60 to 140° C., and more preferably 80 to 120° C. The polymerization initiator used for the production of the polymer preferably has a hydrogen abstraction ability of not more than 20%, more preferably not more than 10%, and still more preferably not more than 5%. The polymerization initiators may be used singly, or two or more may be used in combination. The amount in which the polymerization initiator is used is preferably 0.0001 to 0.5 parts by mass, more preferably 0.0005 to 0.3 parts by mass, and still more preferably 0.001 to 0.2 parts by mass with respect to 100 parts by mass of the monomer(s) subjected to the polymerization reaction.

The hydrogen abstraction ability may be known from materials such as technical data from polymerization initiator manufacturers (for example, technical data "Yuuki Kasankabutsu no Suisohikinukinou to Kaishizaikouritsu (hydrogen abstraction ability and initiator efficiency of organic peroxides)" (April, 2003) from NOF CORPORATION). Further, the hydrogen abstraction ability may be measured by a radical trapping method using α-methylstyrene dimer, namely, an α-methylstyrene dimer trapping method. The measurement is generally performed as follows. First, the polymerization initiator is cleaved into radical fragments in the presence of α-methylstyrene dimer as a radical trapping agent. Among the radical fragments that are generated, those radical fragments having low hydrogen abstraction ability are trapped through addition to the double bond of the α-methylstyrene dimer, while those radical fragments having high hydrogen abstraction ability abstract hydrogen from cyclohexane to generate cyclohexyl radicals, which are then trapped through addition to the double bond of the α-methylstyrene dimer to form a trapped cyclohexane product. The hydrogen abstraction ability is determined by quantifying the cyclohexane or the trapped cyclohexane product, and calculating the proportion (the molar fraction) of the radical fragments with high hydrogen abstraction ability to the theoretical amount of radical fragments generated.

Examples of the chain transfer agents used in the radical polymerization process include alkyl mercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate) and pentaerythritol tetrakisthiopropionate. Among these, monofunctional alkyl mercaptans such as n-octyl mercaptan and n-dodecyl mercaptan are preferable. The chain transfer agents may be used singly, or two or more may be used in combination.

The amount in which the chain transfer agent is used is preferably 0.001 to 1 part by mass, more preferably 0.005 to 0.8 parts by mass, still more preferably 0.01 to 0.6 parts by mass, and most preferably 0.05 to 0.5 parts by mass with respect to 100 parts by mass of the monomer(s) subjected to the polymerization reaction. When the amount of the chain transfer agent used is in the above range, the active energy ray crosslinkable thermoplastic polymer that is obtained tends to attain good shaping processability and high mechanical strength.

In the radical polymerization process for producing the active energy ray crosslinkable thermoplastic polymer used in the present invention, the temperature during the polymerization reaction is, in the case of suspension polymerization, preferably 50 to 180° C., and more preferably 60 to 140° C.

In the case of (continuous) bulk polymerization, the polymerization temperature is preferably 100 to 200° C., and more preferably 110 to 180° C. When the polymerization temperature is 100° C. or above, the productivity tends to be enhanced by factors such as an increased polymerization rate and a lowered viscosity of the polymerization liquid. When the polymerization temperature is 200° C. or below, the polymerization rate may be controlled easily and the formation of byproducts is suppressed to reduce the coloration of the polymer that is obtained.

When produced by suspension polymerization, the active energy ray crosslinkable thermoplastic polymer used in the present invention may be obtained as a granular polymer by performing washing, dehydration and drying in a well-known manner after the completion of the polymerization.

The radical polymerization may be carried out using a batch-type reaction device, but is preferably performed using a continuous flow-type reaction device from the point of view of productivity. In the continuous flow reaction, for example, a liquid mixture including components such as a polymerization ingredient (a monomer), a polymerization initiator and a chain transfer agent is prepared in an atmosphere of nitrogen or the like and is supplied to a reactor at a constant flow rate while discharging the liquid in the reactor at a flow rate corresponding to the supply rate. The reactor used herein may be a tubular reactor that can create a state close to a plug flow and/or a tank reactor capable of creating a state close to a perfectly mixed flow. Further, the polymerization may be performed in a continuous flow manner using a single reactor or using two or more reactors connected to one another.

In the present invention, it is preferable that at least one continuous flow-type tank reactor be used. The amount of liquid in the tank reactor at the time of polymerization reaction is preferably ¼ to ¾, and more preferably ⅓ to ⅔ of the volume of the tank reactor. The reactor is usually equipped with a stirrer. Examples of the stirrers include static stirrers and dynamic stirrers. Examples of the dynamic stirrers include MAXBLEND stirring devices, stirring devices which have a grid-shaped blade rotated about a vertical rotational axis arranged in the center, propeller stirring devices and screw stirring devices. Among these, a MAXBLEND stirring device is preferably used from the point of view of uniform mixing.

In the active energy ray crosslinkable thermoplastic polymer obtained by the above radical polymerization, the molecular weight distribution (Mw/Mn), that is, the ratio of the weight average molecular weight (Mw) to the number average molecular weight (Mn) is preferably not more than 3.20. If the ratio exceeds 3.20, the polymer tends to contain gel components.

The active energy ray crosslinkable thermoplastic polymer of the present invention may be produced by an anionic polymerization process while controlling conditions such as polymerization temperature, the amount of polymerization time, the type and amount of a chain transfer agent, and the type and amount of a polymerization initiator. The anionic polymerization process may be performed using a polymerization technique such as bulk polymerization or solution polymerization.

Examples of the anionic polymerization processes include polymerization using an organic rare earth metal complex as a polymerization initiator (see JP-A-H06-93060), polymerization performed with an organic alkali metal compound as a polymerization initiator in the presence of a mineral acid salt such as an alkali metal or alkaline earth metal salt (see JP-A-H05-507737), and polymerization performed with an organic alkali metal compound as a polymerization initiator in the presence of an organoaluminum compound (see JP-A-H11-335432 and WO 2013/141105). Among these anionic polymerization processes, living anionic polymerization performed with an organic alkali metal compound as a polymerization initiator in the presence of an organoaluminum compound is advantageous in that the active energy ray crosslinkable thermoplastic polymer of the present invention may be produced directly and with good living properties. For the same reason, a more preferred process is anionic polymerization performed with an organolithium compound as a polymerization initiator in the presence of an organoaluminum compound and a Lewis base.

Examples of the organolithium compounds include t-butyllithium, 1,1-dimethylpropyllithium, 1,1-diphenylhexyllithium, 1,1-diphenyl-3-methylpentyllithium, ethyl α-lithioisobutyrate, butyl α-lithioisobutyrate, methyl α-lithioisobutyrate, isopropyllithium, sec-butyllithium, 1-methylbutyllithium, 2-ethylpropyllithium, 1-methylpentyllithium, cyclohexyllithium, diphenylmethyllithium, α-methylbenzyllithium, methyllithium, n-propyllithium, n-butyllithium and n-pentyllithium. From the points of view of availability and anionic polymerization initiating ability, preferred organolithium compounds are those compounds with 3 to 40 carbon atoms which have a chemical structure having a secondary carbon atom as the anionic center, such as isopropyllithium, sec-butyllithium, 1-methylbutyllithium, 1-methylpentyllithium, cyclohexyllithium, diphenylmethyllithium and α-methylbenzyllithium, with sec-butyllithium being particularly preferable. The organolithium compounds may be used singly, or two or more may be used in combination.

The amount in which the organolithium compound is used may be determined relative to the amount of the monomer(s) used, in accordance with the target number average molecular weight of the polymer.

Examples of the organoaluminum compounds include those organoaluminum compounds represented by the following general formula (A-1) or (A-2).

$$AlR^7(R^8)(R^9) \quad (A\text{-}1)$$

In the general formula (A-1), $R^7$ denotes a monovalent saturated hydrocarbon group, a monovalent aromatic hydrocarbon group, an alkoxy group, an aryloxy group or an N,N-disubstituted amino group, and $R^8$ and $R^9$ each independently denote an aryloxy group or $R^8$ and $R^9$ are bonded to each other to form an arylenedioxy group.

$$AlR^{10}(R^{11})(R^{12}) \quad (A\text{-}2)$$

In the general formula (A-2), $R^{10}$ denotes an aryloxy group, and $R^{11}$ and $R^{12}$ each independently denote a monovalent saturated hydrocarbon group, a monovalent aromatic hydrocarbon group, an alkoxy group or an N,N-disubstituted amino group.

Examples of the aryloxy groups denoted by $R^7$, $R^8$, $R^9$ and $R^{10}$ independently in the general formulas (A-1) and (A-2) include phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 1-naphthoxy group, 2-naphthoxy group, 9-phenanthryloxy group, 1-pyrenyloxy group and 7-methoxy-2-naphthoxy group.

Examples of the arylenedioxy groups formed by $R^8$ and $R^9$ bonded to each other in the general formula (A-1) include functional groups derived from compounds having two phenolic hydroxyl groups by the removal of the hydrogen atoms of the two phenolic hydroxyl groups, such as 2,2'-biphenol, 2,2'-methylenebisphenol, 2,2'-methylenebis(4-methyl-6-t-butylphenol), (R)-(+)-1,1'-bi-2-naphthol and (S)-(−)-1,1'-bi-2-naphthol.

The aryloxy groups and the arylenedioxy groups described above may be substituted with a substituent in place of one or more hydrogen atoms. Examples of the substituents include, for example, alkoxy groups such as methoxy group, ethoxy group, isopropoxy group and t-butoxy group; and halogen atoms such as chlorine atom and bromine atom.

Referring to $R^7$, $R^{11}$ and $R^{12}$ in the general formulas (A-1) and (A-2), examples of the monovalent saturated hydrocarbon groups include alkyl groups such as methyl group, ethyl group, n-propyl group, isopropyl group, n-butyl group, isobutyl group, sec-butyl group, t-butyl group, 2-methylbutyl group, 3-methylbutyl group, n-octyl group and 2-ethylhexyl group, and cycloalkyl groups such as cyclohexyl group; examples of the monovalent aromatic hydrocarbon groups include aryl groups such as phenyl group, and aralkyl groups such as benzyl group; examples of the alkoxy groups include methoxy group, ethoxy group, isopropoxy group and t-butoxy group; and examples of the N,N-disubstituted amino groups include dialkylamino groups such as dimethylamino group, diethylamino group and diisopropylamino group, and bis(trimethylsilyl)amino group. The monovalent saturated hydrocarbon groups, the monovalent aromatic hydrocarbon groups, the alkoxy groups and the N,N-disubstituted amino groups described above may be substituted with a substituent in place of one or more hydrogen atoms. Examples of the substituents include alkoxy groups such as methoxy group, ethoxy group, isopropoxy group and t-butoxy group; and halogen atoms such as chlorine atom and bromine atom.

Examples of the organoaluminum compounds represented by the general formula (A-1) include ethylbis(2,6-di-t-butyl-4-methylphenoxy)aluminum, ethylbis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxy[2,2'-methylenebis(4-methyl-6-t-butylphenoxy)]aluminum, ethoxybis(2,6-di-t-butyl-4-methylphenoxy)aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxy[2,2'-methylenebis(4-methyl-6-t-butylphenoxy)]aluminum, t-butoxybis(2,6-di-t-butyl-4-methylphenoxy) aluminum, t-butoxybis(2,6-di-t-butylphenoxy)aluminum, t-butoxy[2,2'-methylenebis(4-methyl-6-t-butylphenoxy)]aluminum, tris(2,6-di-t-butyl-4- methylphenoxy)aluminum and tris(2,6-diphenylphenoxy) aluminum. From points of view such as polymerization initiation efficiency, living properties of polymer end anions, availability and easy handling, preferred compounds are, among others, isobutylbis(2,6-di-t-butyl-4-methylphenoxy) aluminum, isobutylbis(2,6-di-t-butylphenoxy)aluminum and isobutyl[2,2'-methylenebis(4-methyl-6-t-butylphenoxy)]aluminum.

Examples of the organoaluminum compounds represented by the general formula (A-2) include, for example, diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy) aluminum and di-n-octyl(2,6-di-t-butylphenoxy)aluminum. The organoaluminum compounds may be used singly, or two or more may be used in combination.

The organoaluminum compound may be used in a suitable amount that is selected appropriately in accordance with factors such as the type of a solvent and other various polymerization conditions. From the point of view of polymerization rate, it is usually preferable that the amount be in the range of 1.0 to 10.0 mol per 1 mol of the organolithium compound, and more preferably in the range of 1.1 to 5.0 mol, and still more preferably in the range of 1.2 to 4.0 mol. Using more than 10.0 mol of the organoaluminum compound per 1 mol of the organolithium compound tends to result in economic disadvantages. If the amount is below 1.0 mol per 1 mol of the organolithium compound, the polymerization initiation efficiency tends to be decreased.

Examples of the Lewis bases include, for example, compounds having an ether bond and/or a tertiary amine structure in the molecule.

Examples of the compounds having an ether bond in the molecule which are used as the Lewis bases include ethers. From the points of view of high polymerization initiation efficiency and living properties of polymer end anions, preferred ethers are cyclic ethers having two or more ether bonds in the molecule or acyclic ethers having one or more ether bonds in the molecule. Examples of the cyclic ethers having two or more ether bonds in the molecule include, for example, crown ethers such as 12-crown-4, 15-crown-5, and 18-crown-6. Examples of the acyclic ethers having one or more ether bonds in the molecule include, for example, acyclic monoethers such as dimethyl ether, diethyl ether, diisopropyl ether, dibutyl ether and anisole; acyclic diethers such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane and 1,4-diphenoxybutane; and acyclic polyethers such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether and tetrabutylene glycol diethyl ether. From points of view such as side reaction control and availability, acyclic ethers having one or two ether bonds in the molecule are preferable, and diethyl ether or 1,2-dimethoxyethane is more preferable.

Examples of the compounds having a tertiary amine structure in the molecule which are used as the Lewis bases include tertiary polyamines. The tertiary polyamines are compounds having two or more tertiary amine structures in the molecule. Examples of the tertiary polyamines include chain polyamines such as N,N,N',N'-tetramethylethylenediamine, N,N,N',N'-tetraethylethylenediamine, N,N,N',N'',N''-pentamethyldiethylenetriamine, 1,1,4,7,10,10-hexamethyltriethylenetetramine and tris[2-(dimethylamino)ethyl]amine; nonaromatic heterocyclic compounds such as 1,3,5-trimethylhexahydro-1,3,5-triazine, 1,4,7-trimethyl-1,4,7-triazacyclononane and 1,4,7,10,13,16-hexamethyl-1,4,7,10,13,16-hexaazacyclooctadecane; and aromatic heterocyclic compounds such as 2,2'-bipyridyl and 2,2':6',2''-terpyridine.

Further, the Lewis base may be a compound which has one or more ether bonds and one or more tertiary amine structures in the molecule. Examples of such compounds include, for example, tris[2-(2-methoxyethoxy)ethyl]amine.

The Lewis bases may be used singly, or two or more may be used in combination.

From points of view such as polymerization initiation efficiency and living properties of polymer end anions, the amount in which the Lewis base is used is preferably in the range of 0.3 to 5.0 mol per 1 mol of the organolithium compound, and is more preferably in the range of 0.5 to 3.0 mol, and still more preferably in the range of 1.0 to 2.0 mol. Using more than 5.0 mol of the Lewis base per 1 mol of the organolithium compound tends to result in economic disadvantages. If the amount is below 0.3 mol per 1 mol of the organolithium compound, the polymerization initiation efficiency tends to be decreased.

The amount of the Lewis base is preferably in the range of 0.2 to 1.2 mol, and more preferably in the range of 0.3 to 1.0 mol per 1 mol of the organoaluminum compound.

The anionic polymerization is preferably performed in the presence of an organic solvent in order to perform the polymerization at a controlled temperature and to render the system uniform so that the polymerization will take place smoothly. From points of view such as safety, immiscibility with water used for washing of the reaction liquid after the polymerization, and ease in recovery and reuse, preferred organic solvents are, among others, hydrocarbons such as toluene, xylene, cyclohexane and methylcyclohexane; halogenated hydrocarbons such as chloroform, methylene chloride and carbon tetrachloride; and esters such as dimethyl phthalate. The organic solvents may be used singly, or two or more may be used in combination. To ensure that the polymerization will take place smoothly, it is preferable that the organic solvent be dried and be deaerated in the presence of an inert gas beforehand.

In the anionic polymerization, additives may be added to the reaction system as required. Examples of such additives include inorganic salts such as lithium chloride; metal alkoxides such as lithium methoxyethoxyethoxide and potassium t-butoxide; tetraethylammonium chloride and tetraethylphosphonium bromide.

The anionic polymerization is preferably performed at −30 to 25° C. At below −30° C., the polymerization rate is decreased and the productivity tends to be deteriorated. If, on the other hand, the temperature is above 25° C., it tends to be difficult to perform the polymerization of monomers including a methacrylate ester of the general formula (2) with good living properties.

The anionic polymerization is preferably performed in an atmosphere of an inert gas such as nitrogen, argon or helium. Further, it is preferable that the polymerization be conducted while performing sufficient stirring so that the reaction system will be rendered uniform.

In the anionic polymerization, the organolithium compound, the organoaluminum compound, the Lewis base and the monomers are preferably added to the reaction system in such a manner that the Lewis base is brought into contact with the organoaluminum compound before contact with the organolithium compound. The organoaluminum compound may be added to the reaction system before or at the same time with the monomers. When the organoaluminum compound and the monomers are added to the reaction system at the same time, the organoaluminum compound may be mixed together with the monomers beforehand and the resultant mixture may be added.

The anionic polymerization may be terminated by adding to the reaction liquid a polymerization terminator such as a protic compound, for example, methanol; a methanol solution of acetic acid or hydrochloric acid; or an aqueous solution of acetic acid or hydrochloric acid. It is usually preferable that the amount of the polymerization terminator be in the range of 1 to 1,000 mol per 1 mol of the organolithium compound used.

After the termination of the polymerization reaction, the polymer may be separated and collected from the reaction liquid by a known method, for example, by a method where the reaction liquid is poured into a poor solvent for the polymer to cause precipitation, or a method where the polymer is collected by distilling away the organic solvent from the reaction liquid.

If the polymer that has been separated and collected contains residual metal components derived from the catalyst (for example, metal components derived from an organolithium compound and an organoaluminum compound), such residual metals may cause problems such as a decrease in the properties of the active energy ray crosslinkable thermoplastic polymer that is obtained, and poor transparency. It is therefore preferable that if any catalyst-derived metal components are present, the polymer be cleaned of such metal components after the termination of the polymerization. For example, metal components derived from an organolithium compound and an organoaluminum compound may be effectively removed by washing treatment using an acidic aqueous solution, or adsorption treatment using an adsorbent such as ion exchange resin, Celite or activated carbon. Examples of the acidic aqueous solutions which may be used here include, hydrochloric acid, aqueous sulfuric acid solution, aqueous nitric acid solution, aqueous acetic acid solution, aqueous propionic acid solution and aqueous citric acid solution.

In the active energy ray crosslinkable thermoplastic polymer obtained by the anionic polymerization, the molecular weight distribution (Mw/Mn), namely, the ratio of the weight average molecular weight (Mw) to the number average molecular weight (Mn) is usually not more that 2.00, preferably not less than 1.01 and not more than 2.00, more preferably not less than 1.01 and not more than 1.80, and still more preferably not less than 1.01 and not more than 1.50.

⟨Compositions⟩

The active energy ray crosslinkable thermoplastic polymer of the present invention may be used as a composition by, for example, being combined with other components.

In a preferred embodiment, the composition includes a thermoplastic polymer (except the active energy ray crosslinkable thermoplastic polymers of the present invention) including monomer units derived from at least one monomer selected from the group consisting of methyl (meth)acrylate, styrene, acrylonitrile, butadiene and isoprene. Examples of such thermoplastic polymers include polymethyl methacrylate and polystyrene.

When, for example, the composition is crosslinked with an electron beam, the composition may include a crosslinking agent. Any crosslinking agents having a polymerizable reactive group may be used in electron beam crosslinking without limitation. Those crosslinking agents having a reactive group capable of reacting with the monomer unit (1) by a radical mechanism are preferable. The reactive group is more preferably an allyl group or a (meth)acryloyl group, and is still more preferably an allyl group from the point of view of thermal stability of the composition. Examples of the crosslinking agents having an allyl group include trimethylolpropane diallyl ether, pentaerythritol triallyl ether, triallyl isocyanurate, triallyl trimellitate and tetraallyl pyromellitate. Examples of the crosslinking agents having a (meth)acryloyl group include (meth)acrylic acid derivatives such as trimethylolpropane tri(meth)acrylate, trimethylolpropane ethoxytri(meth)acrylate, pentaerythritol tri(meth)acrylate, ethylene glycol di(meth)acrylate, triethylene glycol di(meth)acrylate, tetraethylene glycol di(meth)acrylate, tricyclodecanediyldimethanol di(meth)acrylate, polyethylene glycol di(meth)acrylate, 1,4-butanediol di(meth)acrylate, 1,6-hexanediol di(meth)acrylate, neopentyl glycol di(meth)acrylate, tripropylene glycol di(meth)acrylate, adduct of bisphenol A diglycidyl ether with (meth)acrylic acid at both terminals, pentaerythritol tetra(meth)acrylate, 2,4,6-trioxohexahydro-1,3,5-triazine-1,3,5-trisethanol tri(meth)acrylate, N,N'-bis[2-((meth)acryloyloxy)ethyl]-N'''-(2-hydroxyethyl)-1,3,5-triazine-2,4,6(1H,3H,5H)-trione, tricyclodecanedimethanol di(meth)acrylate, dipentaerythritol hexaacrylate, di(meth)acrylate of a diol which is an adduct of bisphenol A with ethylene oxide or propylene oxide, di(meth)acrylate of a diol which is an adduct of hydrogenated bisphenol A with ethylene oxide or propylene oxide, epoxy (meth)acrylate which is an adduct of bisphenol A diglycidyl ether with (meth)acrylate, and cyclohexanedimethanol di(meth)acrylate; polyfunctional urethane (meth)acrylates obtained by reacting a hydroxyl group-containing polyfunctional (meth)acrylate (such as pentaerythritol tri(meth)acrylate or dipentaerythritol penta(meth)acrylate) with an organic isocyanate (such as tolylene diisocyanate, isophorone diisocyanate, diphenylmethane diisocyanate, hexamethylene diisocyanate or xylylene diisocyanate); epoxy (meth)acrylate resins such as bisphenol A epoxy (meth)acrylate resins, phenol novolac epoxy (meth)acrylate resins, cresol novolac epoxy (meth)acrylate resins and carboxyl-modified epoxy (meth)acrylate resins; urethane (meth)acrylate resins obtained by reacting a urethane resin obtained from a polyol (such as polytetramethylene glycol, polyester diol of ethylene glycol with adipic acid, ε-caprolactone-modified polyester diol, polypropylene glycol, polyethylene glycol, polycarbonate diol, hydroxyl-terminated hydrogenated polyisoprene, hydroxyl-terminated polybutadiene or hydroxyl-terminated polyisobutylene) and an organic isocyanate (such as tolylene diisocyanate, isophorone diisocyanate, diphenylmethane diisocyanate, hexamethylene diisocyanate or xylylene diisocyanate), with a hydroxyl-containing (meth)acrylate (such as hydroxyethyl (meth)acrylate, hydroxypropyl (meth)acrylate, hydroxybutyl (meth)acrylate or pentaerythritol triacrylate); resins obtained by introducing a (meth)acryloyl group into the polyols described above through an ester bond; and polyester (meth)acrylate resins.

When, for example, the composition is crosslinked with UV light, the composition may include a photopolymerization initiator. Examples of the photopolymerization initiators include carbonyl compounds such as acetophenones (for example, 1-hydroxycyclohexyl phenyl ketone, 2,2-dimethoxy-1,2-diphenylethan-1-one, 2-hydroxy-2-methyl-1-phenylpropan-1-one and 2-benzyl-2-dimethylamino-1-(4-morpholinophenyl)-1-butanone), benzophenones (for example, benzophenone, benzoylbenzoic acid, hydroxybenzophenone, 3,3'-dimethyl-4-methoxybenzophenone and acrylated benzophenone), Michler's ketones (for example, Michler's ketone) and benzoins (for example, benzoin, benzoin methyl ether and benzoin isopropyl ether); sulfur compounds such as tetramethylthiuram monosulfide and thioxanthones (for example, thioxanthone and 2-chlorothioxanthone); phosphorus compounds such as acylphosphine oxides (for example, 2,4,6-trimethylbenzoyl-diphenylphosphine oxide and bis(2,4,6-trimethylbenzoyl)-phenylphosphine oxide); titanium compounds such as titanocenes (for example, bis (η5-2,4-cyclopentadien-1-yl)-bis(2,6-difluoro-3-(1H-pyrrol-1-yl)-phenyl)titanium); and azo compounds (for example, azobisisobutyronitrile). The photopolymerization initiators may be used singly, or two or more may be used in combination. Among those described above, acetophenones and benzophenones are preferable.

When the photopolymerization initiator is used, the content thereof is preferably 0.01 to 10 parts by mass, and more preferably 0.05 to 8 parts by mass with respect to 100 parts by mass of the active energy ray crosslinkable thermoplastic polymer of the present invention. When the content is 0.01 part by mass or above, the composition tends to attain good crosslinkability. When the content is 10 parts by mass or less, cured products that are obtained tend to exhibit good heat resistance.

Further, the composition may contain a sensitizer as required. Examples of the sensitizers include n-butylamine, di-n-butylamine, tri-n-butylphosphine, allylthiourea, triethylamine and diethylaminoethyl methacrylate. Among these, diethylaminoethyl methacrylate and triethylamine are preferable.

When the photopolymerization initiator and the sensitizer are used concurrently, the mass ratio of the photopolymerization initiator to the sensitizer is preferably in the range of 10:90 to 90:10, and more preferably in the range of 20:80 to 80:20.

In the composition of the present invention, the content of the active energy ray crosslinkable thermoplastic polymer may be controlled appropriately in accordance with factors such as the target use application. From the point of view of mechanical characteristics, the content is preferably not less than 1 mass %, more preferably not less than 10 mass %, and still more preferably not less than 30 mass %, and is preferably not more than 99 mass %, more preferably not more than 80 mass %, and still more preferably not more than 70 mass %. The content may be 100 mass %.

The composition may include various additives having no active energy ray crosslinkable groups, such as plasticizers, tackifiers, softeners, fillers, stabilizers, pigments and dyes, while ensuring that the crosslinkability of the composition will not be significantly impaired.

The plasticizers may be added to the composition for purposes such as, for example, to control the mechanical strength of cured products obtained by crosslinking the composition. Examples of the plasticizers include phthalate esters such as dibutyl phthalate, diheptyl phthalate, di(2-ethylhexyl) phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; esters of polyalkylene glycols such as diethylene glycol dibenzoate, triethylene glycol dibenzoate and pentaerythritol ester; phosphate esters such as tricresyl phosphate and tributyl phosphate; trimellitate esters; diene (co)polymers such as polybutadiene, butadiene-acrylonitrile copolymer and polychloroprene; polybutene; polyisobutylene; chlorinated paraffins; hydrocarbon oils such as alkyldiphenyls and partially hydrogenated terphenyls; process oils; polyethers such as polyether polyols, for example, polyethylene glycol, polypropylene glycol and polytetramethylene glycol, and derivatives obtained by converting hydroxyl groups of the polyether polyols into ester groups, ether groups or the like; and polyesters obtained from a dibasic acid such as sebacic acid, adipic acid, azelaic acid or phthalic acid, and a dihydric alcohol such as ethylene glycol, diethylene glycol, triethylene glycol, propylene glycol or dipropylene glycol. The term "(co)polymers" indicates both homopolymers and copolymers. The plasticizers may be used singly, or two or more may be used in combination.

The molecular weight or number average molecular weight of the plasticizers is preferably 400 to 15,000, more preferably 800 to 10,000, and still more preferably 1,000 to 8,000. The plasticizers may contain functional groups other than active energy ray crosslinkable groups (such as, for example, hydroxyl groups, carboxyl groups and halogen groups) or may be free from such functional groups. By virtue of the molecular weight or number average molecular weight of the plasticizer being 400 or above, the plasticizer does not bleed out with time from a cured product of the composition and thus it is possible to maintain initial properties over a long term. By virtue of the molecular weight or number average molecular weight of the plasticizer being 15,000 or less, the composition tends to exhibit good handleability.

When the plasticizer is added to the composition, the content thereof is preferably 5 to 150 parts by mass, more preferably 10 to 120 parts by mass, and still more preferably 20 to 100 parts by mass with respect to 100 parts by mass of the active energy ray crosslinkable thermoplastic polymer of the present invention. When added in 5 parts by mass or more, the plasticizer tends to offer marked effects in, for example, the control of properties and characteristics. When the content is 150 parts by mass or less, cured products obtained by crosslinking the composition tend to attain excellent mechanical strength.

The tackifiers may be added to the composition for purposes such as, for example, to impart tackiness to cured products obtained from the composition. Examples of the tackifiers include tackifier resins such as coumarone-indene resins, phenolic resins, p-t-butylphenol-acetylene resins, phenol-formaldehyde resins, xylene-formaldehyde resins, aromatic hydrocarbon resins, aliphatic hydrocarbon resins (for example, terpene resins), styrene resins (for example, polystyrene and poly-α-methylstyrene), polyhydric alcohol rosin esters, hydrogenated rosins, hydrogenated wood rosins, esters of hydrogenated rosins with monoalcohols or polyhydric alcohols, and turpentine tackifier resins. In particular, preferred tackifiers are aliphatic hydrocarbon resins, polyhydric alcohol rosin esters, hydrogenated rosins, hydrogenated wood rosins, and esters of hydrogenated rosins with monoalcohols or polyhydric alcohols.

When the tackifier is added to the composition, the content thereof is preferably 5 to 150 parts by mass, more preferably 10 to 120 parts by mass, and still more preferably 20 to 100 parts by mass with respect to 100 parts by mass of the active energy ray crosslinkable thermoplastic polymer of the present invention. When added in 5 parts by mass or more, the tackifier tends to provide cured products with significant tackiness. When the content is 150 parts by mass or less, cured products tend to attain more excellent flexibility.

The additives having no active energy ray crosslinkable groups may be organic compounds or inorganic compounds.

The composition of the present invention may be prepared by any method without limitation. For example, the composition may be prepared by melt kneading the active energy ray crosslinkable thermoplastic polymer and other optional components (for example, a thermoplastic polymer including monomer units derived from at least one monomer selected from the group consisting of methyl (meth)acrylate, styrene, acrylonitrile, butadiene and isoprene). For example, the melt kneading may be performed with a known mixing device such as a kneader ruder, a single-screw or twin-screw extruder, a mixing roll or a Banbury mixer, or a kneading device. The kneading temperature may be controlled appropriately in accordance with factors such as the melting temperature of the active energy ray crosslinkable thermoplastic polymer, but is preferably 110° C. to 300° C.

⟨Shaped Products⟩

The active energy ray crosslinkable thermoplastic polymer of the present invention or the composition including the polymer may be formed into shaped products by known shaping methods. Examples of the shaping methods include thermoforming methods such as injection molding, extrusion, compression molding, blow molding, calendering, vacuum forming, pressure forming, transfer molding, rotational molding and powder slush molding; and solution casting methods. Among these shaping methods, injection molding and extrusion are preferable. The thickness of the shaped products may vary depending on the shaping method, but is preferably not less than 10 μm from the point of view of mechanical strength.

In a preferred embodiment, the shaped product of the present invention is a multilayer shaped product including:
  a layer (I) obtained from the active energy ray crosslinkable thermoplastic polymer or the composition including the polymer, and
  a layer (II) obtained from a thermoplastic polymer including monomer units derived from at least one monomer selected from the group consisting of methyl (meth) acrylate, styrene, acrylonitrile, butadiene and isoprene (except the active energy ray crosslinkable thermoplastic polymers of the present invention). This multilayer shaped product may be obtained by, for example, extruding the layer (I) and the layer (II) into a multilayer structure.

Specific examples of the thermoplastic polymers for forming the layer (II) are the same as those of the thermoplastic polymers described as a component of the composition hereinabove.

The multilayer extrusion method is not particularly limited and may be such that, for example, layers are extruded by a known method such as a T-die method or a blown-film extrusion method, and the layers are stacked to one another. More specifically, the multilayer extrusion method using a T-die may be, for example, a multimanifold method or a feedblock method. In particular, a multilayer extrusion method using a multimanifold is preferable from the point of view of thickness accuracy. For the reason that a shaped product may be obtained with good surface smoothness after multilayer extrusion, the method preferably includes a step of extruding a melt of a melt-kneaded product from a T-die and shaping the melt while bringing both sides of the melt into contact with the surface of specular rolls or the surface of specular belts. The rolls or the belts used here are preferably made of a metal or a silicone rubber.

The active energy ray crosslinkable thermoplastic polymer of the present invention or the composition including the polymer may be crosslinked into a cured product using an active energy ray applied from a known device. The definition and specific examples of such active energy rays are as described hereinabove. Among the active energy rays, ultraviolet lights and electron beams are preferable from points of view such as crosslinking rate, and the availability and price of irradiators, with electron beams being more preferable.

In the case of electron beams (EB), the accelerating voltage and the dosage are appropriately in the range of 0.1 to 10 MeV and in the range of 1 to 500 kGy, respectively.

Ultraviolet lights may be applied using devices such as high-pressure mercury lamps, ultrahigh-pressure mercury lamps, carbon arc lamps, metal halide lamps, xenon lamps, chemical lamps and LEDs which each emit 150-450 nm wavelength lights. The cumulative dose of the active energy ray is usually in the range of 10 to 20,000 mJ/cm$^2$, and preferably in the range of 30 to 10,000 mJ/cm$^2$. Irradiation with less than 10 mJ/cm$^2$ tends to result in insufficient crosslinking of the active energy ray crosslinkable thermoplastic polymer. The active energy ray crosslinkable thermoplastic polymer may be degraded if the cumulative dose is greater than 20,000 mJ/cm$^2$.

When the active energy ray crosslinkable thermoplastic polymer of the present invention or the composition including the polymer is irradiated with an active energy ray, the irradiation preferably takes place at a relative humidity of not more than 30%, and more preferably not more than 10% to prevent the decomposition of the active energy ray crosslinkable thermoplastic polymer.

During or after the irradiation with an active energy ray, heating may be performed as required to promote crosslinking of the active energy ray crosslinkable thermoplastic polymer the present invention or the composition including the polymer. The heating temperature is preferably in the range of 40 to 130° C., and more preferably in the range of 50 to 100° C.

A cured product obtained as described above may be secondarily processed into an article that is used for a desired purpose. The secondary processing may be performed by, for example, heating or the like which can process the cured product into an article having desired properties. Examples of the secondary processing methods include vacuum forming, insert molding and blow molding.

The active energy ray crosslinkable thermoplastic polymer of the present invention or the composition including the polymer exhibits excellent properties such as, for example, heat resistance and solvent resistance after crosslinking of the polymer. Thus, these materials may be used in numerous applications. For example, some suitable applications are automobile parts, construction parts and lighting materials.

EXAMPLES

The present invention will be described in greater detail based on Examples hereinbelow. However, it should be construed that the scope of the invention is not limited to such Examples.

The materials used in Examples and Comparative Examples are described below.

(Monomers)

Methyl methacrylate: manufactured by KURARAY CO., LTD.

Allyl methacrylate: manufactured by Tokyo Chemical Industry Co., Ltd.

Methyl acrylate: manufactured by Tokyo Chemical Industry Co., Ltd.

(Chain Transfer Agent)

n-Octyl mercaptan: manufactured by Tokyo Chemical Industry Co., Ltd.

(Polymerization Initiators)

Di-t-butyl peroxide: "PERBUTYL D" manufactured by NOF CORPORATION

Azoisobutyronitrile: manufactured by FUJIFILM Wako Pure Chemical Corporation

Incidentally, 3-methyl-3-butene methacrylate that was used was obtained by the dehydration reaction of methacrylic acid and 3-methyl-3-buten-1-ol ("Isoprenol" manufactured by KURARAY CO., LTD.) followed by purification. Further, 3-methyl-2-butene methacrylate that was used was obtained by the dehydration reaction of methacrylic acid and 3-methyl-2-buten-1-ol ("Prenol" manufactured by KURARAY CO., LTD.) followed by purification.

[Number Average Molecular Weight (Mn), Weight Average Molecular Weight (Mw) and Molecular Weight Distribution (Mw/Mn)]

Polymers obtained in Examples and Comparative Examples described later were analyzed by GPC under the following conditions to determine the number average molecular weight (Mn) and the weight average molecular weight (Mw) relative to standard polystyrenes, and the molecular weight distribution (Mw/Mn) was calculated from the values obtained.

(GPC Measurement Conditions)

Apparatus: GPC apparatus "HLC-8220GPC" manufactured by TOSOH CORPORATION

Separation columns: "TSKgel SuperMultipore HZ-M (column diameter=4.6 mm, column length=15 cm)" manufactured by TOSOH CORPORATION (Two columns were connected in series.)

Eluent: Tetrahydrofuran

Eluent flow rate: 0.35 mL/min

Column temperature: 40° C.

Detection method: Differential refractive index (RI)

[Polymer Conversion Ratio]

In Examples 1 and 2 and Comparative Example 4 described later, the polymer conversion ratio was determined as follows. 0.5 mL of the reaction solution was collected and added to 0.5 mL of methanol, the mixture being then mixed. A 0.1 mL portion of the mixture solution was collected and dissolved into 0.5 mL of deuterated chloroform. The resultant mixture was analyzed by $^1$H-NMR measurement under measurement conditions described below. The polymer conversion ratio was calculated from the change in the ratio of the integral of the peak (chemical shift: 5.79 to 6.37 ppm) assigned to the protons directly bonded to the carbon-carbon double bond in the methacrylic acid ester used as a monomer, to the integral of the peak (chemical shift: 7.00 to 7.38 ppm) assigned to the protons directly bonded to the aromatic ring of toluene used as a solvent.

($^1$H-NMR Measurement Conditions)

Apparatus: Nuclear magnetic resonance apparatus "JNM-ECX400" manufactured by JEOL Ltd.

Temperature: 25° C.

[Glass Transition Temperature (Tg)]

The glass transition temperature was measured using differential scanning calorimeter DSC 822e (manufactured by METTLER TOLEDO) at a heat-up rate of 20° C./min.

[Thermoformability]

With a compression molding machine (manufactured by Shinto Metal Industries, Ltd.), polymers obtained in Examples and Comparative Examples described later were heated at a predetermined temperature and a pressure of 100 kgf/cm$^2$ for 1 hour. The thermoformability was evaluated based on the solubility of the heated polymer into tetrahydrofuran. The thermoformability was rated as ⊙ when the polymer heated at 300° C. was completely dissolved, as ○ when the polymer heated at 200° C. was completely dissolved, and as x when the polymer heated at 200° C. was not completely dissolved.

[Electron Beam Irradiation Conditions]

With a compression molding machine (manufactured by Shinto Metal Industries, Ltd.), polymers obtained in Examples and Comparative Examples described later were formed into 300 μm thick flat sheets, which were then irradiated with an electron beam under the following conditions.

(Electron Beam Irradiation Conditions)

Apparatus: Dynamitron electron beam accelerator manufactured by Radiation Dynamics Inc.

Irradiation voltage: 4.8 MeV

Current: 20 mA

Irradiation speed: 14 m/min

Irradiation dose: 200 kGy

[Gel Fraction After Electron Beam Irradiation]

The cured products obtained by the electron beam irradiation under the above conditions were weighed and were thereafter immersed in tetrahydrofuran at room temperature for 48 hours. The cured products were taken out and the surface thereof was further washed with tetrahydrofuran. The cured products were then dried at 80° C. and 0.2 Pa for 12 hours, and the mass after immersion was measured. From the masses of the cured product measured before and after the immersion, the gel fraction was calculated using the following formula.

Gel fraction (%)=(mass after immersion/mass before immersion)×100

The materials such as monomers used in Examples and other experiments are abbreviated as follows.

Methyl methacrylate: MMA

3-Methyl-3-butene methacrylate: 3M3BMA

3-Methyl-2-butene methacrylate: 3M2BMA

Allyl methacrylate: ALMA

3-Methyl-3-butene acetate: 3M3BAc

Methyl acrylate: MA (Reference Example 1) Q value (3-methyl-3-butene methacrylate)

In order to determine the Q value of the carbon-carbon double bond moiety contained in the monomer unit (1) of 3-methyl-3-butene methacrylate used in Examples and Comparative Examples described later, 3-methyl-3-butene acetate and methyl acrylate (Q value: 0.45, e value: 0.64) were copolymerized while changing the compositional ratio (the molar ratio) of the monomers. The copolymers obtained were analyzed by $^1$-NMR measurement, and the compositional ratio (the molar ratio) of the monomer units in the copolymer was calculated from the ratio of the integral of the peak (chemical shift: 3.80 to 4.35 ppm) assigned to the protons directly bonded to the methylene group bonded to the oxygen in 3-methyl-3-butene acetate, to the integral of the peak (chemical shift: 3.35 to 3.80 ppm) assigned to the protons directly bonded to the methyl group bonded to the oxygen in methyl acrylate. The $^1$-NMR conditions are the same as those described hereinabove with respect to the polymer conversion ratio.

The compositional ratio of the monomers used in the polymerization, the compositional ratio of the monomers in the copolymer obtained, and the monomer reactivity ratios $r_1$ and $r_2$ calculated from these results are described in Table 1.

TABLE 1

|  | Feed | | Polymer | | | |
| --- | --- | --- | --- | --- | --- | --- |
|  | MA | 3M3BAc | MA | 3M3BAc | $r_1$ | $r_2$ |
| Test 1 | 0.02 | 0.98 | 0.53 | 0.47 | 3.23 | 0.0029 |
| Test 2 | 0.07 | 0.93 | 0.45 | 0.55 | | |
| Test 3 | 0.86 | 0.14 | 0.05 | 0.95 | | |

Using the results of $r_1$ and $r_2$ described in Table 1, the Q value was calculated from the formula (iii) to be 0.035.

(Reference Example 2) Q value (3-methyl-2-butene methacrylate)

The Q value of the carbon-carbon double bond moiety contained in the monomer unit (1) of 3-methyl-2-butene methacrylate was determined in the same manner as in Reference Example 1, except that 3-methyl-3-butene acetate was replaced by 3-methyl-2-butene acetate. The Q value was 0.006.

Incidentally, the Q value is 0.24 of allyl acetate which is an acetic acid ester corresponding to allyl methacrylate used in Comparative Examples described later (reference: POLYMER HANDBOOK FOURTH EDITION).

(Example 1) Anionic Polymerization (A-1)

A glass reaction vessel equipped with a stirring blade and a three-way cock was purged with nitrogen. At room temperature, the reaction vessel was charged with 246 g of toluene, 0.3 g of 1,1,4,7,10,10-hexamethyltriethylenetetramine, 7.43 g of a 0.45 M toluene solution of isobutylbis (2,6-di-t-butyl-4-methylphenoxy) aluminum and 0.77 g of a 1.3 M solution of sec-butyllithium (solvent: 95% cyclohexane and 5% n-hexane). While performing stirring, 100 g of 3M3BMA as a monomer was added dropwise at a rate of 20 mL/min to the solution in the reaction vessel at 0° C., and thereby polymerization was initiated. After the completion of the dropwise addition of the monomer, the solution was continuously stirred at 0° C. for another 7 hours. The color of the solution changed from yellow to colorless. The polymer conversion ratio of 3M3BMA at this stage was 100%. Next, 35 g of an 80% aqueous acetic acid solution was added to terminate the anionic polymerization. The solution obtained was poured into 5000 g of methanol to precipitate a solid. The solid precipitate was separated by filtration and was dried at 80° C. and 0.2 Pa for 24 hours to give a polymer (A-1) weighing 98 g. The polymer (A-1) obtained had Mn of 64000, Mw/Mn of 1.12 and a glass transition temperature of 18.8° C.

(Example 2) Anionic Polymerization (A-2)

A polymer (A-2) weighing 98 g was obtained in the same manner as in Example 1, except that the monomer composition was changed as described in Table 2. The polymer (A-2) obtained had Mn of 67000, Mw/Mn of 1.04 and a glass transition temperature of 117.8° C.

(Example 3) Bulk Polymerization (B-1)

A thoroughly dried pressure resistant vessel equipped with a stirrer was purged with nitrogen. The pressure resistant vessel was then charged with 95 g of methyl methacrylate, and was further charged with 5 g of 3M3BMA, 0.22 g of n-octyl mercaptan as a chain transfer agent and 0.002 g of di-t-butyl peroxide as an initiator. While performing stirring, the mixture in the pressure resistant vessel was heated to 140° C. and thereby the polymerization reaction was initiated. The mixture was further stirred continuously at 140° C. for 2.5 hours. Thereafter, the mixture was cooled to room temperature to terminate the polymerization. The solution obtained was diluted by the addition of 150 g of toluene and was poured into 8000 g of methanol to precipitate a solid. The solid precipitate was separated by filtration and was dried at 80° C. and 0.2 Pa for 24 hours to give a polymer (B-1) weighing 47 g. The polymer (B-1) obtained had Mn of 47000, Mw/Mn of 2.49 and a glass transition temperature of 117.3° C.

(Example 4) Suspension Polymerization (C-1)

A glass separable flask equipped with a stirrer, a thermometer, a reflux tube and a three-way cock was purged with nitrogen. The flask was charged with 196 g of deionized water, 100 g of 3M2BMA, 0.06 g of azoisobutyronitrile as an initiator, 0.32 g of n-octyl mercaptan as a chain transfer agent, 1.2 g of a dispersant and 3.3 g of a pH adjuster. While performing vigorous stirring, the solution in the separable flask was heated to 75° C. and thereby polymerization was initiated. Stirring was continued at 75° C. for 180 minutes. Further, the temperature was raised to 90° C. and stirring was performed at the temperature for 60 minutes. The polymerization was thereby completed. After cooling, the polymer obtained was separated by filtration, washed with water several times, and dried at room temperature for 24 hours. Further, the polymer was dissolved into 300 g of acetone, and the solution was poured into 5000 g of methanol to precipitate a solid. The solid precipitate was separated by filtration and was dried at 80° C. and 0.2 Pa for 24 hours to give a polymer (C-1) weighing 85 g. The polymer (C-1) obtained had Mn of 39000, Mw/Mn of 2.05 and a glass transition temperature of 33° C.

(Example 5) Suspension Polymerization (C-2)

A polymer (C-2) weighing 90 g was obtained in the same manner as in Example 4, except that the monomer composition was changed as described in Table 2. The polymer (C-2) obtained had Mn of 42000, Mw/Mn of 1.9 and a glass transition temperature of 118.3° C.

(Example 6) Suspension Polymerization (C-3)

A polymer (C-3) weighing 85 g was obtained in the same manner as in Example 4, except that the monomer composition was changed as described in Table 2. The polymer (C-3) obtained had Mn of 105000, Mw/Mn of 2.03 and a glass transition temperature of 120.2° C.

(Comparative Example 1) Suspension Polymerization (C-4)

A polymer (C-4) weighing 89 g was obtained in the same manner as in Example 4, except that the monomer composition was changed as described in Table 2. The polymer (C-4) obtained had Mn of 51000, Mw/Mn of 2.94 and a glass transition temperature of 123.6° C.

(Comparative Example 2) Suspension Polymerization (C-5)

A polymer (C-5) weighing 88 g was obtained in the same manner as in Example 4, except that the monomer composition was changed as described in Table 2. The polymer (C-5) obtained had Mn of 45000, Mw/Mn of 1.92 and a glass transition temperature of 123.2° C.

(Comparative Example 3) Suspension Polymerization (C-6)

The process described in Example 4 was repeated, except that the monomer composition was changed as described in Table 2. The polymer included components insoluble in solvents such as acetone, tetrahydrofuran and toluene, and the molecular weight could not be measured.

(Comparative Example 4) Anionic Polymerization (A-3)

A polymer (A-3) weighing 98 g was obtained in the same manner as in Example 1, except that the monomer composition was changed as described in Table 2. The polymer (A-3) obtained had Mn of 65000, Mw/Mn of 1.08 and a glass transition temperature of 118.5° C.

The polymers obtained in Examples and Comparative Examples were analyzed by the aforementioned methods to evaluate the thermoformability and the gel fraction after electron beam irradiation. The results are described in Table 2.

TABLE 2

| | Polymerization method | Monomer composition (mol %) | | | | Mn | Mw/Mn | Tg | Thermoformability | Gel fraction after electron beam irradiation |
| | | MMA | 3M3BMA | 3M2BMA | ALMA | | | | | |
| --- | --- | --- | --- | --- | --- | --- | --- | --- | --- | --- |
| Ex. 1 | Anionic polymerization | 0 | 100 | 0 | 0 | 64,000 | 1.12 | 18.8 | ○ | 99% |
| Ex. 2 | Anionic polymerization | 93.3 | 6.7 | 0 | 0 | 67,000 | 1.04 | 117.8 | ⊙ | 98% |
| Ex. 3 | Bulk polymerization | 96.7 | 3.3 | 0 | 0 | 47,000 | 2.49 | 117.3 | ⊙ | 52% |
| Ex. 4 | Suspension polymerization | 0 | 0 | 100 | 0 | 39,000 | 2.05 | 33 | ○ | 74% |
| Ex. 5 | Suspension polymerization | 93.3 | 0 | 6.7 | 0 | 42,000 | 1.9 | 118.3 | ⊙ | 63% |
| Ex. 6 | Suspension polymerization | 96.7 | 0 | 3.3 | 0 | 105,000 | 2.03 | 120.2 | ⊙ | 47% |
| Comp. Ex. 1 | Suspension polymerization | 99.35 | 0.65 | 0 | 0 | 51,000 | 2.94 | 123.6 | ⊙ | 0% |
| Comp. Ex. 2 | Suspension polymerization | 99.35 | 0 | 0.65 | 0 | 45,000 | 1.92 | 123.2 | ⊙ | 0% |
| Comp. Ex. 3 | Suspension polymerization | 99.35 | 0 | 0 | 0.65 | — | — | — | — | — |
| Comp. Ex. 4 | Anionic polymerization | 91.9 | 0 | 0 | 8.1 | 65,000 | 1.08 | 118.5 | X | — |

In Examples 1, 2 and 3, polymers containing 3M3BMA were produced. These polymers showed good active energy ray crosslinkability as compared to the polymer from Comparative Example 1 which contained 0.65 mol % of the monomer units (1).

In Examples 4, 5 and 6, polymers containing 3M2BMA were produced. These polymers showed good active energy ray crosslinkability as compared to the polymer from Comparative Example 2 which contained 0.65 mol % of the In Comparative Example 3, a polymer containing 0.65 mol % ALMA was produced by suspension polymerization. Some components were insoluble in solvents such as acetone, tetrahydrofuran and toluene, and difficulties in obtaining a thermoplastic polymer were present.

In Comparative Example 4, a polymer containing 8.1 mol % ALMA was produced by anionic polymerization. Crosslinking proceeded when the polymer was heated, and some components were insoluble in tetrahydrofuran. Thus, difficulties in thermoforming were present.

INDUSTRIAL APPLICABILITY

The active energy ray crosslinkable thermoplastic polymers of the present invention have a polymerizable functional group but still can be thermoformed without being crosslinked, and undergo crosslinking upon irradiation with an active energy ray such as ultraviolet light or electron beam after being formed. Thus, the active energy ray crosslinkable thermoplastic polymers of the present invention are useful as various shaped products.

The invention claimed is:

1. An active energy ray crosslinkable thermoplastic polymer comprising monomer units represented by the following general formula (1), the ratio of the number of moles of the monomer units represented by the general formula (1) to the number of moles of all monomer units constituting the polymer being not less than 1 mol %, the active energy ray crosslinkable thermoplastic polymer having a number average molecular weight (Mn) of 20,000 to 500,000,

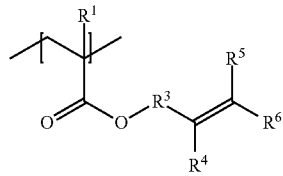

(1)

wherein $R^1$ is hydrogen or a methyl group, $R^3$ is a C2 saturated hydrocarbon group, $R^4$ is a methyl group, $R^5$ and $R^6$ are each hydrogen.

2. The active energy ray crosslinkable thermoplastic polymer according to claim 1, wherein the ratio of the number of moles of the monomer units represented by the general formula (1) to the number of moles of all the monomer units constituting the polymer is not more than 40 mol %.

3. The active energy ray crosslinkable thermoplastic polymer according to claim 1, wherein the monomer units represented by the general formula (1) are monomer units derived from an ester of an unsaturated alcohol having a Q value of not less than 0.001 and not more than 0.35.

4. A composition comprising:

an active energy ray crosslinkable thermoplastic polymer comprising monomer units represented by the following general formula (1), the ratio of the number of moles of the monomer units represented by the general formula (1) to the number of moles of all monomer units constituting the polymer being not less than 1 mol %, the active energy ray crosslinkable thermoplastic polymer having a number average molecular weight (Mn) of 20,000 to 500,000,

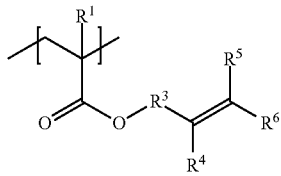

(1)

wherein $R^1$ is hydrogen or a methyl group, $R^3$ is a C1-C10 saturated hydrocarbon group, $R^4$ is hydrogen or a C1-C5 saturated hydrocarbon group, $R^5$ and $R^6$ are each hydrogen or a C1-C20 saturated hydrocarbon group, and at least one of $R^4$, $R^5$ and $R^6$ is a saturated hydrocarbon group, and a thermoplastic polymer comprising monomer units derived from at least one monomer selected from the group consisting of methyl (meth)acrylate, styrene, acrylonitrile, butadiene and isoprene.

5. A shaped product obtained from the active energy ray crosslinkable thermoplastic polymer described in claim 1.

6. A shaped product obtained by injection molding an active energy ray crosslinkable thermoplastic polymer comprising monomer units represented by the following general formula (1), the ratio of the number of moles of the monomer units represented by the general formula (1) to the number of moles of all monomer units constituting the polymer being not less than 1 mol %, the active energy ray crosslinkable thermoplastic polymer having a number average molecular weight (Mn) of 20,000 to 500,000,

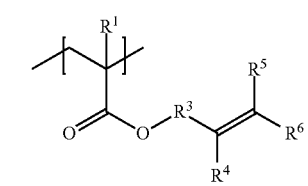

(1)

wherein $R^1$ is hydrogen or a methyl group, $R^3$ is a C1-C10 saturated hydrocarbon group, $R^4$ is hydrogen or a C1-C5 saturated hydrocarbon group, $R^5$ and $R^6$ are each hydrogen or a C1-C20 saturated hydrocarbon group, and at least one of $R^4$, $R^5$ and $R^6$ is a saturated hydrocarbon group.

7. A shaped product obtained by extruding the active energy ray crosslinkable thermoplastic polymer described in claim 1.

8. A multilayer shaped product comprising:

a layer obtained from the active energy ray crosslinkable thermoplastic polymer described in claim 1, and a layer obtained from a thermoplastic polymer comprising monomer units derived from at least one monomer selected from the group consisting of methyl (meth) acrylate, styrene, acrylonitrile, butadiene and isoprene.

9. A cured product of the shaped product described in claim 5.

10. An article obtained by secondary processing of the cured product described in claim 9.

11. A shaped product obtained from the composition described in claim 4.

12. A shaped product obtained by injection molding the composition described in claim 4.

13. A shaped product obtained by extruding the composition described in claim 4.

14. A multilayer shaped product comprising:

a layer obtained from the composition described in claim 4, and a layer obtained from a thermoplastic polymer comprising monomer units derived from at least one monomer selected from the group consisting of methyl (meth) acrylate, styrene, acrylonitrile, butadiene and isoprene.

15. A cured product of the shaped product described in claim 11.

16. An article obtained by secondary processing of the cured product described in claim 15.

* * * * *